United States Patent [19]

Inae et al.

[11] 4,435,236

[45] Mar. 6, 1984

[54] METHOD OF MANUFACTURING A FOLDABLE BICYCLE TIRE HAVING FLEXIBLE BEADS

[75] Inventors: Shoji Inae; Harunori Okamoto, both of Kagawa, Japan

[73] Assignee: Mitsuboshi Belting Ltd., Kobe, Japan

[21] Appl. No.: 400,202

[22] Filed: Jul. 20, 1982

Related U.S. Application Data

[62] Division of Ser. No. 269,097, Jun. 2, 1981, Pat. No. 4,378,042.

[30] Foreign Application Priority Data

Jun. 11, 1980 [JP] Japan .................................. 55-79390

[51] Int. Cl.³ .................... B29H 17/22; B29H 17/32; B60C 15/04
[52] U.S. Cl. .................................. 156/132; 156/133; 156/136; 156/131; 156/403; 156/422; 156/407; 156/414; 152/359; 152/362 R; 57/241; 57/902; 264/501; 264/326
[58] Field of Search ............................... 156/123–124, 156/131, 132, 133–134, 135, 136, 130.7, 117, 130.5, 397, 403, 422, 405.1, 406, 406.4, 421.4, 400–402, 407, 414, 460; 152/359, 362 R, 362 CS, 330 R; 57/236, 240, 241–242, 260, 902; 245/1.5; 264/501, 502, 326

[56] References Cited

U.S. PATENT DOCUMENTS

| | | | |
|---|---|---|---|
| 1,609,620 | 12/1926 | Gammeter | 156/131 |
| 1,914,040 | 6/1933 | Pierce | 156/131 |
| 3,446,003 | 5/1969 | Kolek et al. | 152/359 |
| 4,022,009 | 5/1977 | Van Assendelft | 152/359 |
| 4,098,316 | 7/1978 | Carvalho et al. | 156/136 |
| 4,293,018 | 10/1981 | Dubois | 152/362 R |
| 4,320,791 | 3/1982 | Fujii et al. | 152/362 R |
| 4,378,042 | 3/1983 | Inae et al. | 156/136 |

FOREIGN PATENT DOCUMENTS

992617  10/1951  France .................... 152/362 R

*Primary Examiner*—Lois E. Boland
*Attorney, Agent, or Firm*—Sughrue, Mion, Zinn, Macpeak and Seas

[57] ABSTRACT

An improved bicycle tire which can be folded for storage and transportation while maintaining the same running properties as a conventional tire. A plurality of bead cores made of a cord tensile member embedded in the bead section of the tire are provided by winding three to five turns of a cord tensile member having a low elongation ratio and high strength and which has been twisted one to two turns/10 cm in such a manner that the start and finish ends of the bead core overlap one another by 60 to 150 mm. The bead core preferably has a cut elongation of 5% or less and the strength of 300 kg/core.

9 Claims, 9 Drawing Figures

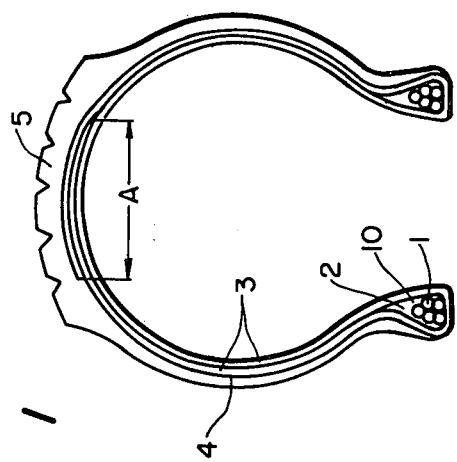
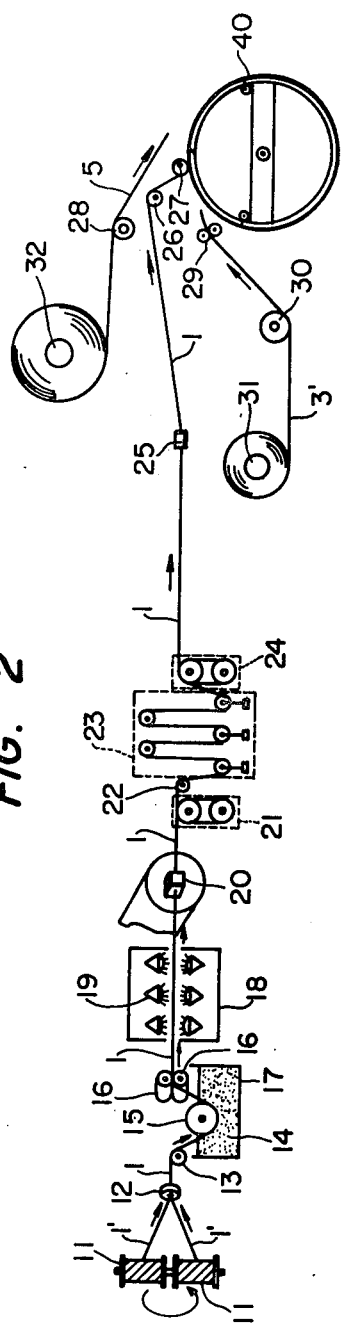
FIG. 1
FIG. 2

METHOD OF MANUFACTURING A FOLDABLE BICYCLE TIRE HAVING FLEXIBLE BEADS

This is a division of application Ser. No. 269,097, filed June 2, 1981, now U.S. Pat. No. 4,378,042.

BACKGROUND OF THE INVENTION

The present invention relates to a bicycle tire which is made foldable by embedding in the bead sections, bead cores of thin strands of hardened steel or twisted cords which are made of light and flexible non-organic or organic fibrous material.

Heretofore, ring-shaped bead wires have been employed for the bead section of a bicycle tire. Such a bead wire has a high rigidity and repulsive elasticity and therefore it will stretch very little so that a tire using such bead wires can be firmly fitted onto a rim. Furthermore, the bead wire is sufficiently strong to function as a bead core. However, since the bead wire has a low flexibility, the bead wire cannot be folded. Accordingly, the bead wires must be stored or shipped as they are, that is, it is impossible to deform them for storage or shipping. Thus, the conventional bead wire suffers from a drawback in that it is impossible to closely pack them.

A tire of this type includes, in general, the following three essential members:

(1) An unvulcanized tread rubber member which is formed by extruding kneaded compound rubber into a trapezoidal form, or with the use of a calender, in such a manner that the central or the tread portion thereof is thick while the side portions are thin.

(2) A carcass member made of a belt-shaped tire fabric which is formed according to a method in which an organic or non-organic fibrous cord fabric woven in the form of a tire fabric is subjected to adhesion treatment, covered with rubber cement and subjected to friction treatment or rubber coating, and the fibrous cord fabric thus treated is cut on the bias (usually at 15° to 70°) into pieces of tire fabric which are joined together to form a belt-shaped tire fabric.

(3) An endless bead wire which is fabricated according to a method in which a hardened steel wire covered with rubber is wound in the form of a coil a plurality of turns according to the dimensions of a tire to be manufactured, or a piece of hardened steel wire is annularly formed and both ends thereof are welded together or connected together with a nipple into an endless hardened steel wire.

The following methods have been employed for manufacturing the above-described tire:

(1) A carcass tire fabric having a predetermined width and length is wound endlessly on a separable drum having two bead wire grooves in its outer wall spaced a predetermined distance from each other, or on a stretchable forming drum having a plurality of segments by deforming a portion of the drum, or by reducing the circumferential length of the drum, i.e. contracting the drum. Then, two ring-shaped or coil-shaped bead wires, which are fabricated in a separate manufacturing step, are positioned on the carcass tire fabric manually or by another suitable method. Thereafter, the bead wires are tensioned on the drum by restoring the deformed drum or expanding the contracted segments of the drum. Then, both sides of the carcass are folded inwardly along the bead wires manually or by using a conventional folding device so that they overlap in the central portion of the carcass. Thereafter, the two sides are depressed with a roller or the like to form plies of the carcass. An unvulcanized tread rubber member which is fabricated in a separate manufacturing process is bonded to the plies or the carcass under pressure to form the tire.

(2) Two plies of carcass tire fabrics having opposite bias angle directions are wound on the outer wall of the drum employed in the above-described method (1). More specifically, a carcass tire fabric woven in one bias angle direction and having a width slightly larger than the distance between the bead grooves is wound, as the first ply of carcass tire fabric, on the drum, and a carcass tire fabric woven in the opposite bias angle direction and having a width slightly smaller than that of the first ply of carcass tire fabric is wound thereon in such a manner that, when the two plys of carcass tire fabric are folded, the edges thereof are spaced apart from each other at each side (see FIGS. 8 and 9). Similarly as in the above-described method (1), a pair of bead wires are placed on the two plys of carcass tire fabric along the bead grooves, both ends of the two plys of carcass tire are folded, and a tread rubber member is bonded thereto.

(3) In a third method, a two-drum system is employed using two drums on each of which are formed two bead wires grooves spaced a predetermined distance apart from each other. One pair of bead wires is set in the bead grooves of the two drums and are tensioned by increasing the distance between the axes of the two drums with an air cylinder. On the two-drum system, the distance between the axes of the drums can be adjusted with an air cylinder or the like.) Tire fabrics, each having a predetermined width in the direction of arrangement of tire fabric cords, wound on two spools are laid over the bead wires by spirally winding the two spools around the two bead wires while simultaneously turning the drums to move the bead wires. Then, the tire fabrics are depressed against the drum with a roller to form a tire carcass and an unvulcanized rubber member is bonded to the tire carcass to form the tire.

In each of the above-described conventional methods, the essential members, namely, the tread rubber member, the carcass tire fabric and the bead wire which have been fabricated in separate manufacturing processes, are employed. Of these essential members, the bead wires serving as the tensile members of a tire are especially flexible making it difficult to maintain them circular. This restrains the automatic formation of tires.

Tires formed according to the above-described methods are unsatisfactory in quality. If the size and specification of a tire is changed, it is necessary to change the specification and dimension of the bead wire used. It is necessary to have on hand a variety of forming drums as it is also necessary to use different forming drums for bead wires of different dimensions. This is uneconomical. Furthermore, whenever the tire size is changed, the forming drum must be changed. Thus, the conventional methods are disadvantageous in the number of manufacturing steps, in the time required to manufacture the tires and in safety.

In general, the bead wires fabricated in the separate manufacturing process are bundled at a density of 100 to 500 pieces/bundle for storage. For this purpose, an adhesion preventing agent is applied to the bead wires so that, during storage or transport, they do not adhere to one another through the rubber covering thereof. The adhesion preventing agent later adversely affects the bonding of the bead wires to the carcass during the manufacturing process. Furthermore, during transport, the rubber covering the bead wires tends to deform due to the adhesion preventing agent. Accordingly, a tire having a correct configuration and dimensions cannot be produced. Also, as described above, since a number of bead wires are bundled for storage and tend to cling to one another, prior to manufacture of tires, it is necessary to manually separate the bead wires from one another, which is time consuming. In addition, the bead wires may be deformed to the extent that they cannot be used.

SUMMARY OF THE INVENTION

A first object of the invention is to provide a bicycle tire which is substantially equal in strength to a conventional tire with bead wires and which is small in weight and is foldable. The tire is manufactured using a method in which, unlike a conventional method, bead wires of steel are not employed and instead bead cores made of non-organic or organic fibrous members which have a low elongation ratio and high strength and flexibility or of strands of these materials are employed.

A second object of the invention is to provide a bicycle tire manufacturing method in which a bicycle tire having a desired structure can be easily and continually manufactured without the problems accompanying the use of conventional bead wires.

In accordance with these and other objects of the invention, there is provided a tire, specifically, a bicycle tire, including a plurality of bead cores made of core tensile member embedded in these sections of the tire. Each of the bead cores is fabricated by winding three to five turns of a cord tensile member having a low elongation ratio and high strength which has been twisted one to two turns/10 cm in such a manner that the start and finish end of the bead core overlap 60 to 150 mm, with a bead core having a cut elongation of 5% or less and the strength of 300 kg/core.

Furthermore, the invention provides a method for manufacturing tire, specifically, a bicycle tire, including the steps of twisting two previously untwisted linear members supplied from corresponding bobbins at one to two turns/10 cm to form a cord tensile member, adhesion treating the cord tensile member, drying the cord tensile member, covering the cord tensile member with rubber, accumulating the rubber-covered cord tensile member in an accumulator, winding a bias tire fabric having a predetermined width and length on a former in the outer wall of a drum of which bead grooves spaced a predetermined distance from each other are formed, joining both ends of the bias tire fabric to form an endless tire fabric, winding bead core tensile member accumulated in the accumulator on the endless tire fabric on the drum of the former along each of the bead grooves to three to five/turns, overlapping start and finish ends of the cord tensile member wound along each of the bead grooves by 60 to 150 mm, binding together the start and finish ends with bead rubber to form a bead core, folding both sides of the endless tire fabric inwardly along bead cores to form a tire fabric member with beads, bonding a tread rubber member having a predetermined width and length to the tire fabric member with beads to form an unvulcanized tire, and vulcanizing the unvulcanized tire under predetermined conditions.

The foregoing objects and other objects of the invention will become clear from the following detailed description. However, it should be noted that the invention is not limited thereto or thereby, and it is believed evident to those skilled in the art that various changes and modification may be made thereto without departing from the invention.

BRIEF DESCRIPTION OF THE DRAWINGS

FIG. 1 is a cross-sectional view of an example of a bicycle tire produced according to the invention;

FIG. 2 is a schematic side view illustrated a bicycle tire manufacturing method according to the invention;

DESCRIPTION OF THE PREFERRED EMBODIMENTS

Figure 3:
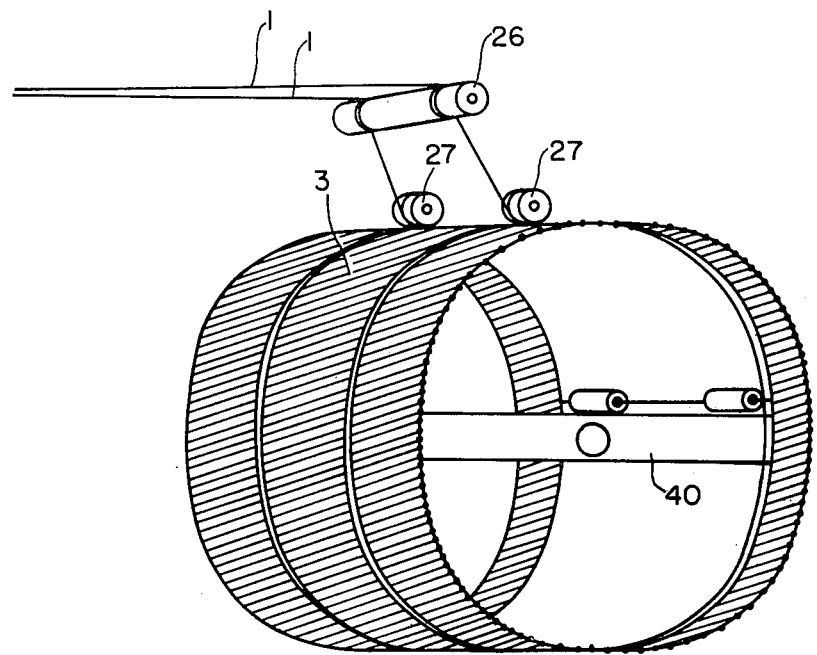
FIG. 3 is a perspective view showing one of the tire manufacturing steps according to the method of the invention.

Preferred embodiments of the invention will be described with reference to the accompanying drawings.

FIG. 1 shows a sectional view of a bicycle tire constructed according to the invention. In FIG. 1, reference numeral 1 designates a twisted cords tensile member which is formed by twisting at a rate of 1 to 2 turns/10 cm hardened steel thin strands or organic or non-organic fibers such as untwisted polyamide fibers, glass fibers, or carbon fibers. The twisted cord tensile member is wound with three to five turns and is overlapped 60 to 150 mm at both ends to provide a bead core 10 having a cut elongation of less than 5% and a strength of more than 300 kg/core.

As shown in FIG. 1, the bead cores 10 formed by binding a plurality of cord tensile members as described above are embedded in bead rubber members 2 in such a manner that on both sides of the tires the bead cores are bonded organic or non-organic fiber cords and are surrounded by two plys of carcass tire fabric 3 made of bias tire fabric. Three plys of tire fabric 3 are provided over a predetermined width A in the central portion of the tire.

A thin side wall rubber member 4 and a thick tread rubber member 5 having a tread pattern on its outer surface are bonded to the surface of the carcass 3 in a conventional manner. At that point, the fabrication of the tire has been completed.

The configuration and structure of the tire is somewhat similar to those of an ordinary tire. However, it should be noted that the bead construction of the tire of the invention is significantly different. Specifically, the embedded bead cores 10 are made of the above-described materials and processed under the above-described conditions.

The organic or non-organic fiber cord tensile members 1 forming the bead cores 10 are twisted at the rate of 1 to 2 turns/10 cm. If the tensile member is not twisted, its strength is decreased. If it is twisted at a rate of more than 2 turns/10 cm, its expansibility is increased and the product may be uneven and liable to stretch. Thus, the rate of 1 to 2 turns/10 cm is suitable. Both ends of the cord tensile member 1 are fixed by the adhesive force of the bead rubber member 2. Therefore, if the cord tensile member 1 is wound with less than three turns the strength of the connection of the tensile member 1 is reduced compared with those of other portions, and therefore, when the tire is fitted into a rim, a problem may occur in that the bead may be stretched or broken thus lowering the safety of the tire. If the rope tensile member 1 is wound with more than six turns, difficulties that the bead may stretch and that the strength is reduced can be eliminated. However, other troubles are caused, for instance, the materials needed are more expensive, the number of manufacturing steps is increased, and the bead is then enlarged making it difficult to fit the tire onto a rim and adversely affecting the outer appearance of the tire.

A number of experiments have proved it suitable for the cord tensile members 1 to be wound with three to five turns. It is suitable and necessary that both ends of the tensile member 1 be overlapped 60 to 150 mm. This relates to the number of windings described above. The ends of the tensile member are bonded to the bead rubber member. If both ends of the tensile member overlap less than 60 mm, the connecting strength is insufficient which may cause a problem in that is is then difficult to fit the tire onto a rim. If the overlapping range is more than 150 mm, the connecting strength is sufficient. However, the bead volume is then partially increased. Thus, it is best that the ends of the tensile member overlap 60 to 150 mm.

It is essential for the bead core 10 obtained by winding the above-described twisted cord tensile member 1 to have a cut elongation of less than 5% and a strength of more than 300 kg/core. With a cut elongation of more than 5%, the bead core can be easily elongated and the tire may come off the rim during running. If the strength of the core 10 is less than 300 kg/core, it cannot function as a tensile member and the tire can readily be broken. Thus, it is necessary that a bead core 10 having a cut elongation of less than 5% and a strength of more than 300 kg/core be embedded in the bead rubber member 2. Of the above-described various materials, aromatic polyamide fibers (such as that sold under the trade name Kevlar) are preferred for fabricating the twisted cord tensile members.

As described above, the bead section of the bicycle tire according to the invention is made up of bead cores having predetermined characteristics which are provided by using hardened steel strands or twisted cords of organic or non-organic fibers. With the described construction, a tire of the invention is lighter than a conventional tire with bead wires and, importantly, it can be folded. These are significant merits and features of a tire of the invention. Owing to the features, tires of the invention can be closely packed together for storage and shipping. The above-described technical concept of the invention is applicable not only to a bicycle tire but also to motorcycle and automobile tires.

Next, according to another aspect of the invention, a method manufacturing the above-described bicycle tire will be described.

A particular feature of this method resides in that the formation of the carcass tire fabric and the formation of the bead core and carried out in succession.

As shown in FIG. 2, a pair of bobbins 11 on which low-elongation and high-strength linear members 1' such as thin strands of hardened steel or linear members of untwisted polyamide fibers, glass fibers or carbon fibers are turned so that two linear members 1' are pulled out in the directions indicated by arrows and are caused to pass through a guide 12 so that they are twisted at the rate of 1 to 2 turns/10 cm into one twisted cord tensile member 1. It is apparent from the above description that twisting the linear members at the rate of 1 to 2 turns/10 cm is done to readily fix the bead cores after the formation of the tire and to maintain the tensile stength of the beads in the tire.

Then, in order for the rope tensile member 1 to be later satisfactorily bonded to rubber, it is delivered through the guide roller 12 into a tank 17 where it is immersed in adhesive solution 14 by an immersing roll 15. Thereafter, excessive amounts of adhesive solution are removed from the cord tensile member 1 while it passes through a pair of squeezing rolls 16 and 16. The cord tensile member 1 thus treated is passed through a drying zone 18 provided with infrared ray lamps 19 where the volatile components in the adhesive solution are evaporated away. Following this adhesion treatment, the cord 1 is covered with bead rubber to a thickness of 0.1 to 0.5 mm by a rubber extruder 20. The cord tensile member thus covered with rubber is delivered through a powder brake 21 (which is a type of electrical brake) and a guide roller 22 to an accumulator 23, comprising upper rolls which are stationary and lower tension rolls which are movable vertically, where it is accumulated.

Only when the accumulator 23 is coupled directly to a forming device is the cord tensile member 1 accumulated in the accumulator 23, usually to a length corresponding to one or two tires. However, if the accumulator is not coupled directly to the forming device, the cord tensile member 1 is wound on a bobbin provided separately and held until the molding operation is carried out.

The formation of the carcass tire fabric which is carried out in association with the delivery of the cord tensile member will now be described. A piece of tire fabric covered with rubber in a separate process is bias-cut into pieces having a predetermined width. These pieces are connected to one another to form a belt-shaped tire fabric 3'. The long tire fabric 3' is wound on a tire fabric core 31. During this formation, the tire fabric 3' is pulled out of the core 31 and is delivered by a guide roll 30 and retaining rolls 29 to a drum-shaped former which has bead grooves spaced a predetermined distance from each other on the outer wall thereof and is separable. The tire fabric is wound on the former with the drum tensioned and is then joined to form an endless tire fabric 3 (see FIG. 3). It is noted that, in the ordinary procedure of forming a tire, the tire fabric is wound on a former before the bead tensile member is subjected to adhesion treatment.

Figure 4:
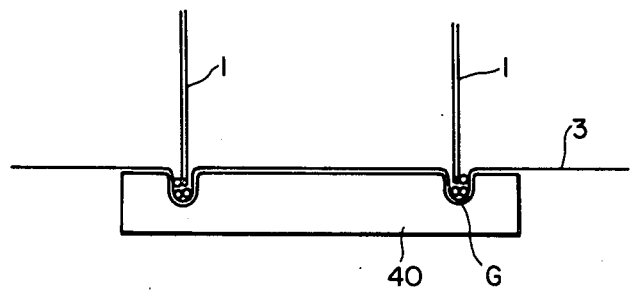
FIG. 4 is a partial sectional view for a description of the tire manufacturing step shown in FIG. 3.

The bead tensile member 1 subjected to adhesion treatment and covered with rubber in the previous step is wound on the carcass tire fabric 3 thus formed. The bead tensile member is pulled out of the accumulator where it was accumulated. Alternatively, if the bead tensile member 1 is wound on the separately provided bobbin as described above, it is pulled out of the bobbin. The tensile member is then delivered through the powder brake 24, for adjusting the tension thereon, and through the guide 25 and a retaining roll 27 to the former 40. The bead tensile member thus delivered is wound on the carcass fabric 3 on the former 41 along the bead groove as shown in FIG. 3. In this operation, it is necessary to give a predetermined tension to the bead tensile member. For this purpose, the tension of the bead tensile member is adjusted by the powder brakes 21 and 24 provided respectively upstream of and downstream of the accumulator. As shown in FIGS. 3 and 4, the end of the bead tensile member 1 is fixed to a position of the bead groove G in the drum of the former 40 on which the carcass fabric 3 has been wound by bonding and depressing it into the bead grooves with the retaining rolls 27. Then, the former 40 is turned so that the bead tensile member is wound in the form of layers in the bead groove after which it is cut off. The cut end is bonded to form a bead core 10 which is in the form of plural wound and bundled bead tensile members.

In winding the bead tensile member 1, the member 1 is tensile. Until the former 40 makes a half revolution after the end of the bead tensile member 1 was fixed to the bead groove, a tension of 2 kg or less is applied to the bead tensile member. Thereafter, the bead tensile member 1 is wound under a tension of 5 to 20 kg. Since the former 40 is in its start state just before it makes the half revolution, if the tension is increased to more than 2 kg, problems may occur in that the bead tensile members fixed to the carcass 3 may come off the latter or the surface of the carcass 3 may be creased because the tension if too large. Thus, when the former 40 starts, it is necessary to set the tension to less than 2 kg. After the former has made a half revolution, the bead tensile members 1 are strongly bonded to the carcass, and therefore the above-described problems will not occur. However, a tension of less than 5 kg is insufficient. In this case, the inner circumferential dimension of the bead tensile member 1 is varied by the rigidity of the carcass fabric 3, that is, it is impossible to obtain the correct bead circumferential length. As a result, it is impossible to correctly fit the produced tire onto a rim. On the other hand, a tension of more than 20 kg is excessive. In this case, after the bead tensile member has been wound, not only is it difficult to remove the carcass 3 from the former 40, but also the former 40 and its related parts may be damaged when the carcass is removed from the former 40. Both sides of the carcass are then wavy, as a result of which the produced green tire is deformed. Thus, the bead tensile members should be wound under a tension of 5 to 20 kg, more preferebly 7 to 10 kg, in order to attain the desired dimensions of the bead cores with a high accuracy.

Both ends of the bead tensile member 1 are fixed with the bead rubber 3 as described above. If the bead tensile member 1 is wound with less than three turns, the strength of the finished end thereof is greatly reduced which may lead to problems that, when the tire is fitted into a rim, the bead may be elongated or broken. On the other hand, if it is wound with more than five turns, the strength is excessively increased and the material cost and the number of manufacturing steps are increased. Thus, the bead tensile member should be wound three to five turns.

The start end and the finish end of the tensile member 1 are overlapped 60 to 150 mm because, as described above, with less than 60 mm, the connecting strength is insufficient, and with more than 150 mm, it is excessive.

The bead tensile member 1 thus wound is extended over the carcass 3 on the former 40 to form the bead core 10 (FIG. 1) having a cut elongation of less than 5% and a strength of more than 300 kg/core, which are suitable for a bicycle tire. The bead cores of the tire may be formed one after another or then may be formed simultaneously by using a pair of bead tensile members 1 as shown in FIG. 3. In the latter case, two lines each including bonding, drying, rubber covering and accumulating processes are necessary to wind the two bead tensile members simultaneously. The two lines should be arranged in parallel.

Figure 5:
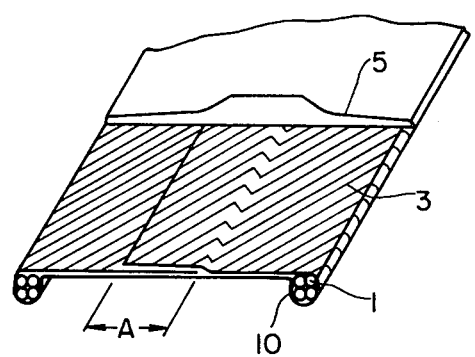
FIG. 5 is a perspective view, partially cut away, showing another tire manufacturing step.

After the bead tensile members 1 have been wound on the carcass, the carcass is folded with a conventional folding device. First, one of the two portions of the carcass 3 which are outside the bead cores 10 is folded inwardly and then the other portion is folded inwardly. Thereafter, the outer wall of the carcass 3 thus folded is depressed with a roller as a result of which a carcass tire fabric member having three plies of carcass tire fabric over a width A in the central portion is provided. This is shown in FIG. 5. This folding operation can be in general, carried out manually with the folding device. However, it may be achieved by using a cylindrical automatic folding device provided on both sides of the separable drum of the former 10. In the latter case, the carcass can be automatically folded simultaneously when the formation of the bead cores 10 has been achieved.

Then, the start end, cut obliquely, of an unvulcanized tread rubber member 5 trapezoidal in section which has been wound on a winding core 32 (FIG. 2) is pulled through a guide roll 28 to the carcass 3 and is then bonded to the outer wall of the carcass 3 while the former 40 is turned. The unvulcanized tread rubber member 5 is cut obliquely to obtain the finish end, which is fitted to the start end. While the former 40 is turning, the outer wall of the tread rubber member 5 is depressed with a depressing roller so that a green tire is formed in which the carcass 3 is firmly bonded to the tread rubber member 5. In general, the tread rubber member 5 is manually bonded to the carcass. However, the bonding operation can be achieved by using an automatic tread bonding device which automatically carries out a series of bonding, cutting and joining operations. The employment of this device is preferable.

The green tire thus formed is removed from the former 40 by bending the former 40 inwardly and disassembling it. The green tire is then subjected to vulcanization in a vulcanizing press. As a result, a bicycle tire having a section as shown in FIG. 1 is produced.

Figure 6:
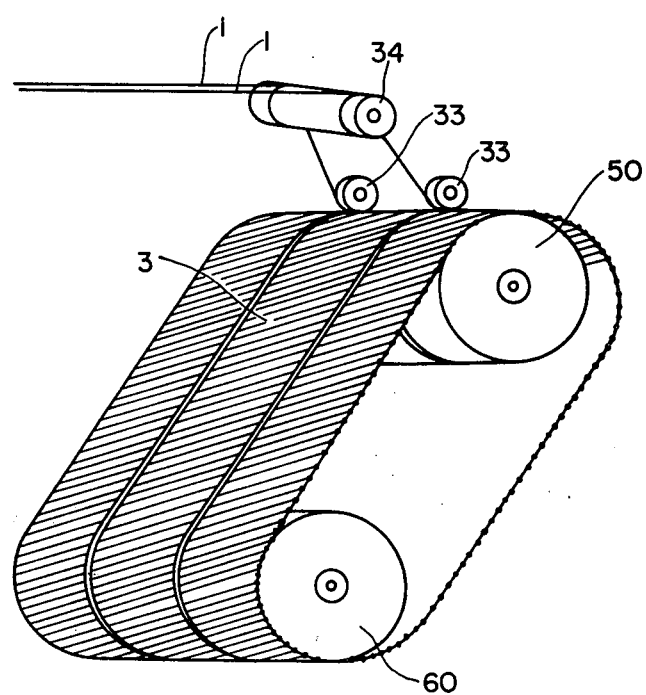
FIG. 6 is a perspective view showing a modification of the tire manufacturing method according to the invention.

The above-described tire manufacturing method is of the one-drum system in which a tire is formed on one former drum having a predetermined circumferential length. However, the system is disadvantageous in that the drum must be changed whenever the size of a tire to be manufactured is changed. This difficulty can be eliminated by employing a two-drum system as shown in FIG. 6. In this system, the former has two forming drums 50 and 60. The distance between the axes of the drums 50 and 60 is set by using an air cylinder (not shown) so that a carcass tire fabric 3 having a desired dimension can be laid over the two drums. After the carcass tire fabric 3 has been tensioned, the bead tensile members 1 are extended through a guide roll 34 and are than depressed against the bead grooves of the drum 50 with retaining rolls 33. Under this condition, plural turns of the bead tensile members 1 are wound on the carcass tire fabric by turning the drums 50 and 60, and are then cut off. Similarly as in the case of the above-described one-drum system, the carcass folding operation and the tread bonding operation are carried out. Thereafter, the former drums 50 and 60 are set closer to each other by operating the air cylinder to remove the produced green tire from the former. The green tire is vulcanized in a vulcanizing device.

The above-described two-drum system is industrially advantageous in that, as the distance between the axes of the two drums can be set as desired, tires of different size can easily be formed. Accordingly, this system is economical and practical.

As described above, in the tire manufacturing method of the invention, both sides of single-ply carcass tire fabric are alternately folded along the bead cores using the one-drum system or two-drum system to provide two plies of carcass tire fabric. However, in a modification of this tire manufacturing method, two plies of carcass tire fabric are used to form a tire as shown in FIGS. 7 and 8.

Figure 7:
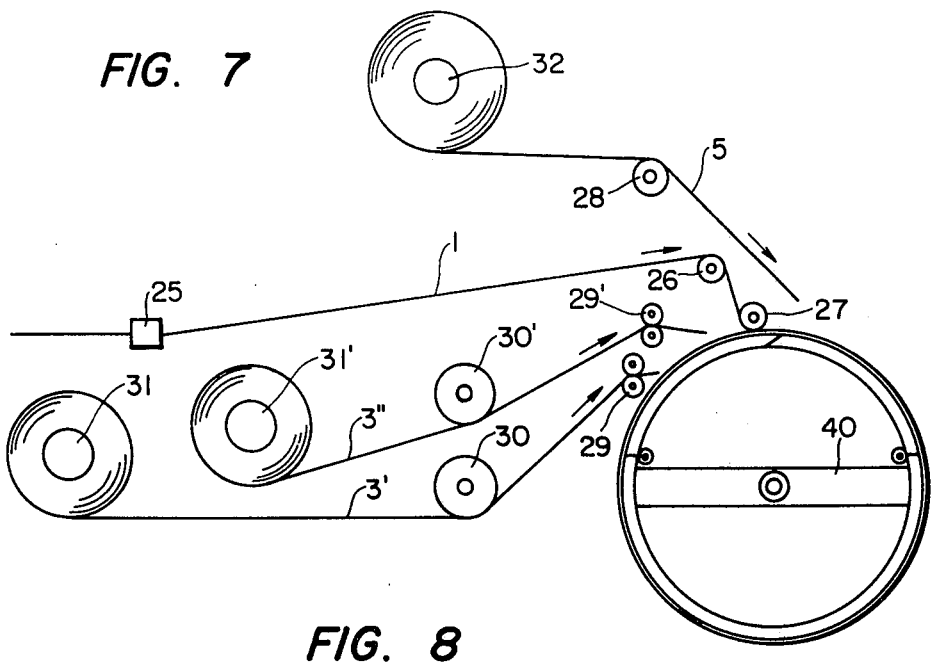
FIG. 7 is a schematic side view showing another modification of the tire manufacturing method according to the invention.
Figure 8:
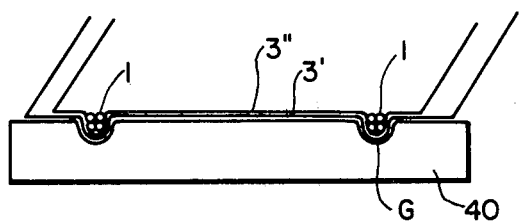
FIG. 8 is a partial sectional view for a description of the modification shown in FIG. 7.

In this modification, as shown in FIG. 7, a belt-shaped bias tire fabric 3' having a width slightly larger than the distance between the bead grooves, which is wound on a winding core 31, is wound as the first ply on a former drum 40 (which may be of the two-drum system). The tire fabric thus wound is cut off and both ends of the tire fabric are joined together. A belt-shaped bias tire fabric 3" smaller in width than the bias tire fabric 3' described above is wound as the second ply on another winding core 31' and cut in the opposite direction. The bias tire fabric 3" is wound on the bias tire fabric 3', which was wound on the former drum. A carcass tire fabric member is thus formed made up of two plies of tire fabric 3' and 3" which are laminated one on another.

Then the rubber-covered bead tensile members 1 subjected to adhesion treatment in the preceding process are bonded to the second tire fabric 3" along the bead grooves G of the former. Thereafter, the bead tensile members 1 are wound on the second tire fabric 3" a predetermined number of turns under a predetermined tension, cut off and fixed. Then, both sides of the carcass tire fabric member are folded along the bead cores according to the above-described method.

Figure 9:
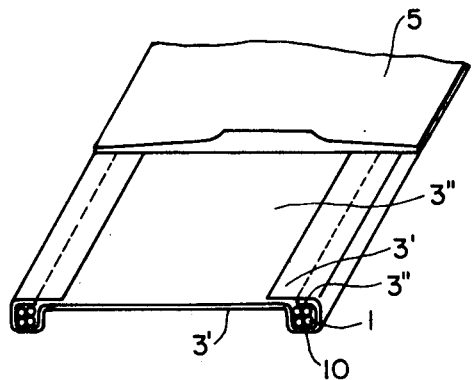
FIG. 9 is a perspective view, partially cut away, illustrating a tire manufacturing step according to the modification in FIG. 7.

In this case, unlike the above-described case, both sides of the carcass tire fabric members are not overlapped in the central portion of the carcass tire fabric member. That is, as shown in FIG. 9, rigid beads are formed by covering the bead cores 10 with two plys of tire fabric 3' and 3". Next, the unvulcanized tread rubber member is pulled out of the winding core 32 and is then bonded to the carcass tire fabric member. The unvulcanized tread rubber member is cut off and both ends thereof are joined together. The unvulcanized tread rubber member thus treated is vulcanized to produce a complete tire.

In FIGS. 7 and 2, like parts are designated by like reference numerals.

In the case where a formed tire is vulcanized according to any one of the above-described methods, in order to maintain the configuration of the beads satisfactory, it is desirable that the bead diameter or the bead circumferential length of a tire vulcanizing metal mold be smaller by 0.1 to 0.5% than the inside diameter or the inner circumference of the bead grooves of the former. If it is smaller by more than 0.5%, th outer dimension of a formed tire is excessively large and burrs are formed on the tire. Therefore, the tire may come off the rim.

Thus, it is not desirable to set this value to more than 0.5%.

Accordingly, it is preferred that the bead diameter or the bead circumferential length of a tire vulcanizing metal mold be smaller by 0.1 to 0.5% than the inside diameter or the inner circumference of the bead grooves of the former. This can be similarly applied to a conventional metal mold for a bead wire, which is of a single piano wire type, or a bundle of three or four gromment bead wires. It is desirable that the bead diameter of the tire vulcanizing metal mold used in the invention be smaller by 0.1 to 0.5% than the bead diameter of the above-described conventional metal mold because, with the use of the invention, the elongation of the tire is slightly larger than that provided when a conventional bead wire is used and it is necessary to take that difference in elongation into account. However, if it is smaller by more than 0.5%, the tire cannot be fitted onto a rim. The above-described vulcanizing method, of course, contributes to the effective achievement of the tire manufacturing method according to the invention.

As is apparent from the above description, the invention provides a bicycle tire and method of manufacture thereof in which the bead cores made of twisted cores of organic or non-organic flexible fibers which are treated under predetermined conditions and have low elongation ratios and high strength are embedded in the bead sections. A bicycle tire of the invention provides the following various merits and advantageous effects:

(1) The bead cores are embedded in bead sections which are formed by winding plural turns of cord made of fibers having a low elongation ratio and high strength. By so doing, the tire of the invention is substantially equal in strength to a conventional bead wire tire. The tire of the invention can be firmly fitted onto a rim. Thus, the tire is substantially equal in performance to a conventional tire.

(2) The bead cores are flexible. Therefore, unlike a conventional tire, the tire of the invention can be folded compact, and accordingly it is unnecessary to provide a large space for storage and shipping tires, in contrast to the case of the conventional tire.

(3) In accordance with the method of the invention, the formation of the bead cores an the tires can be simultaneously carried out and the vulcanization process carried out in a short period. Therefore, with the method of the invention, unlike a conventional method, fluctuations of the bead core dimension due to the transportation, storage and degradation over time of the bead core are eliminated and tires are manufactured with a degree of high accuracy. Especially, the accuracy of the bead diameter of a bicycle tire must be high as the dimensional tolerance of the rim is large. The method of the invention satisfies this requirement and provides for the manufacture of tires which can be satisfactorily fitted onto rims.

(4) Heretofore, bundles of 100 to 500 bead wires were stored with an adhesion preventing agent applied to the bead wires to prevent the wires from adhering to one another during storage. Accordingly, during the later manufacturing process, it was necessary to manually serarate bundles of bead wires before they could be used on the production line. On the other hand, with the method of the invention, the bead tensile member which, simultaneously when the carcass is formed, is subjected to adhesion treatment and is then accumulated in the accumulator, is continuously wound. Accordingly, the steps of bundling bead wires, coating head wires with and adhesion preventing agent and separating bead wires, which are required in the prior art method, are eliminated thereby contributing to a reduction of the number of manufacturing steps.

(5) Heretofore, different size bead wires had to be manufactured and stored for different size tires. However, using the method of the invention, bead wires of different size can be formed by winding a flexible cord tensile member. Therefore it is unnecessary to manufacture and store different size bead wires for different size tires. The cord tensile member can be wound into a bead wire freely according to a desired tire size, and it is unnecessary to manufacture bead wires in advance and to store them. Accordingly, degradation of the bead wires which may be caused during storage is eliminated. Furthermore, the economic loss due to storage is also eliminated. Thus, the method of the invention contributes greatly to an improvement of the quality of produced tires and to a reduction of the manufacturing cost thereof.

What is claimed is:

1. A method of manufacturing a tire comprising: the steps of;
   twisting two untwisted linear members having a low elongation ratio and high strength supplied from corresponding bobbins at 1 to 2 turns/10 cm to form a cord tensile member,
   adhesion treating said cord tensile member;
   drying said cord tensile member;
   covering said cord tensile member with rubber; accumulating the rubber covered cord tensile member in an accumulator;
   winding a bias tire fabric having a predetermined width and length on a former in the outer wall of which bead grooves spaced a predetermined distance from each other are formed;
   joining both ends of said bias tire fabric to form an endless tire fabric;
   winding said cord tensile member accumulated in said accumulator on said endless tire fabric on a drum of said former along each of said bead grooves to three to five turns;
   overlapping start and finish ends of said cord tensile member wound along each bead groove 60 to 150 mm;
   bonding together said start and finish ends with bead rubber to form a bead core having a cut elongation of 5% or less and a strength of 300 kg/core;
   folding both sides of said endless tire fabric inwardly along said bead cores to form a tire fabric member with beads;
   bonding a tread rubber member having predetermined width and length to said tire fabric member with beads to form an unvulcanized tire; and
   vulcanizing said unvulcanized tire under predetermined conditions.

2. The method as claimed in claim 1 wherein said former is of a separable one-drum type.

3. The method as claimed in claim 1 wherein said former is of a two-drum type in which a distance between axes of two drums is adjustable.

4. The method as claimed in claim 3 wherein said step of winding said bias tire fabric comprises winding a belt-shaped bias tire fabric having a width slightly larger than a distance between said bead grooves and further comprising the step of winding a second belt-shaped bias tire fabric onto said first-mentioned bias tire fabric, said second belt-shaped bias tire fabric having a lesser width than said first-mentioned bias tire fabric.

5. The method as claimed in claim 1 wherein, in said step of winding said bias tire fabric on said former, said cord tensile member is wound on said former under a tension of 2 kg or less while said former makes a first half revolution, and under a tension of 5 to 20 kg after said former has completed said first half revolution.

6. The method as claimed in claim 1 wherein, in said step of widning said bias tire fabric on said former said rope tensile member is wound on said former under a tension of 2 kg or less while said former makes a first half revolution, and under a tension of 7 to 10 kg after said former has completed said first half revolution.

7. The method as claimed in any of claims 1 through 6 wherein, in said tire vulcanizing step, at least one of a bead diameter and bead circumferential length of a tire vulcanizing metal mold is smaller by 0.1 to 0.5% than a corresponding inside diameter and inner circumference of each bead groove of said former.

8. The method as claimed in any one of claims 1 through 6 wherein, in said tire vulcanizing step, a bead diameter of a tire vulcanizing metal mold is smaller by 0.1 to 0.5% than that of a conventional metal mold.

9. The method as claimed in any of claims 1 through 6 wherein said linear members are made of a material selected from the group consisting of thin strands of hardened steel, polyamide fiber strands, glass fiber strands and carbon fiber strands.

* * * * *